US012639585B2

(12) United States Patent
Sethi et al.

(10) Patent No.: US 12,639,585 B2
(45) Date of Patent: May 26, 2026

(54) PROACTIVE ALERT AGGREGATION AND CORRELATION MANAGEMENT WITH AUTOMATED SUMMARIZATION

(71) Applicant: DELL PRODUCTS, LP, Round Rock, TX (US)

(72) Inventors: Parminder Singh Sethi, Punjab (IN); Kanika Kapish, Muzaffarnagar (IN); Amihai Savir, Sansana (IL); Anat Parush Tzur, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 1091 days.

(21) Appl. No.: 17/323,489

(22) Filed: May 18, 2021

(65) Prior Publication Data

US 2022/0374726 A1    Nov. 24, 2022

(51) Int. Cl.
| | |
|---|---|
| *G06N 5/022* | (2023.01) |
| *G06F 16/901* | (2019.01) |
| *G06F 16/9032* | (2019.01) |
| *G06F 16/906* | (2019.01) |
| *G06F 40/30* | (2020.01) |

(52) U.S. Cl.
CPC ......... *G06N 5/022* (2013.01); *G06F 16/9024* (2019.01); *G06F 16/90332* (2019.01); *G06F 16/906* (2019.01); *G06F 40/30* (2020.01)

(58) Field of Classification Search
CPC ................ G06N 5/022; G06F 16/9024; G06F 16/90332; G06F 16/906; G06F 40/30
See application file for complete search history.

(56) References Cited

U.S. PATENT DOCUMENTS

| | | | | |
|---|---|---|---|---|
| 5,857,198 A | * | 1/1999 | Schmidt | G06F 40/232 |
| | | | | 712/201 |
| 6,356,911 B1 | * | 3/2002 | Shibuya | G01C 21/3446 |
| | | | | 707/999.005 |
| 8,890,676 B1 | * | 11/2014 | Heath | G08B 29/188 |
| | | | | 340/508 |
| 10,936,822 B2 | | 3/2021 | Ganesan | |
| 2005/0278440 A1 | * | 12/2005 | Scoggins | H04W 8/00 |
| | | | | 345/23 |
| 2006/0117059 A1 | * | 6/2006 | Freeman, Jr. | G06F 11/3447 |
| | | | | 707/999.102 |
| 2015/0280968 A1 | * | 10/2015 | Gates | G06F 11/0769 |
| | | | | 714/37 |
| 2015/0288557 A1 | * | 10/2015 | Gates | G06F 11/0709 |
| | | | | 714/37 |
| 2017/0180206 A1 | | 6/2017 | Ahmed et al. | |
| 2019/0173776 A1 | * | 6/2019 | Levy | H04L 47/11 |
| 2019/0227860 A1 | * | 7/2019 | Gefen | G06F 16/9024 |
| 2019/0340241 A1 | * | 11/2019 | Ganesan | G06F 40/247 |
| 2019/0340242 A1 | | 11/2019 | Ganesan | |
| 2020/0042700 A1 | * | 2/2020 | Li | G06F 21/554 |

* cited by examiner

*Primary Examiner* — Tamara T Kyle
*Assistant Examiner* — William Wong
(74) *Attorney, Agent, or Firm* — Larson Newman, LLP

(57) ABSTRACT

An information handling system includes a data store configured to store an account associated with a first alert and a second alert. A processor may receive the first alert and the second alert, map the first alert and the second alert to a first node and a second node of a causality graph, traverse the causality graph starting from the sink node to the source node to determine an association between the first alert and the second alert, and generate the account based on the association between the first alert and the second alert.

20 Claims, 5 Drawing Sheets

200

Figure 1:
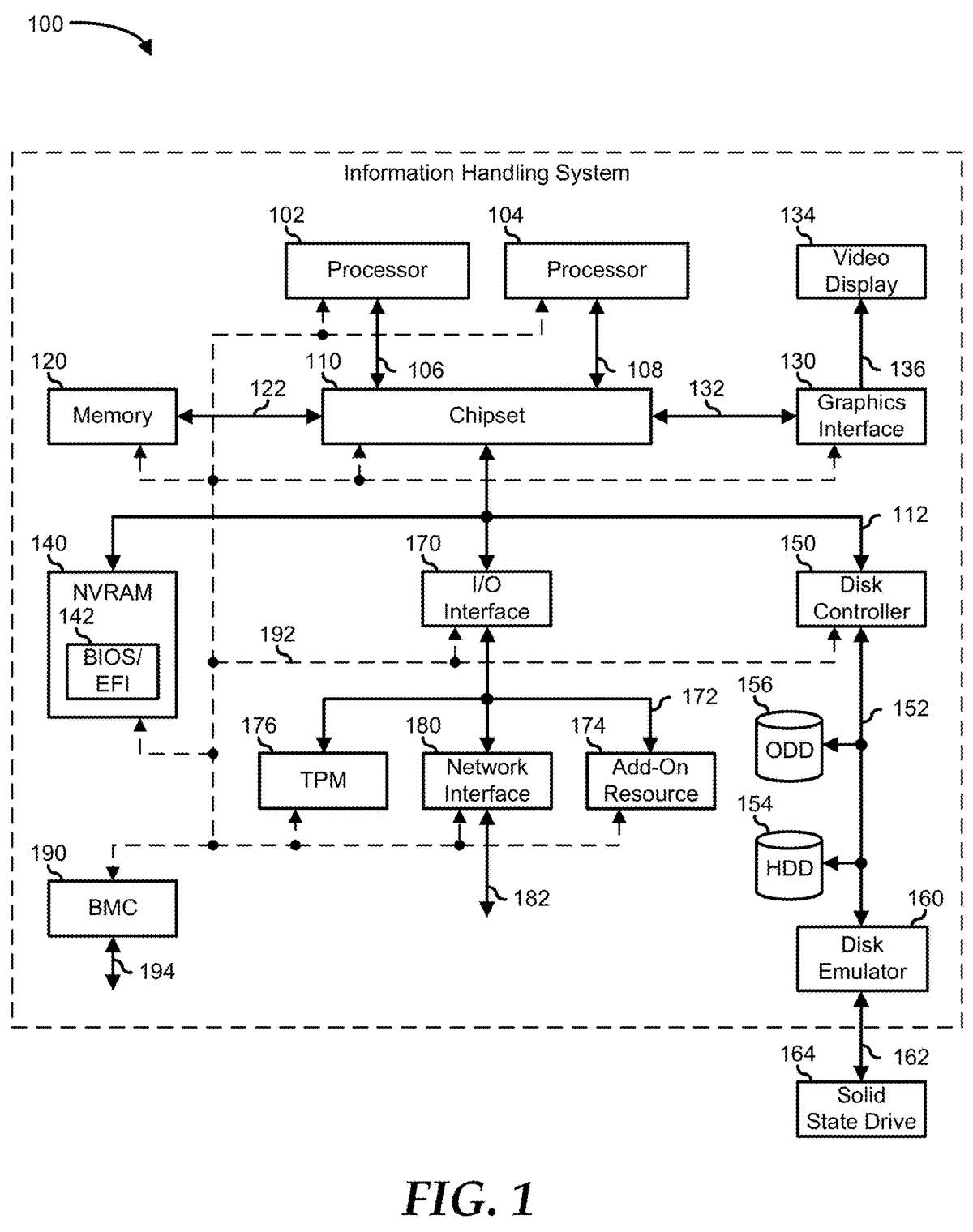

100

Information Handling System

102 Processor

104 Processor

134 Video Display

120 Memory

122

110 106 Chipset 108

132

130 136 Graphics Interface

112

140 NVRAM
142 BIOS/EFI

192

170 I/O Interface

150 Disk Controller

176 TPM

180 Network Interface 174 172 Add-On Resource

156 ODD

152

154 HDD

182

190 BMC

194

160 Disk Emulator 164 162 Solid State Drive

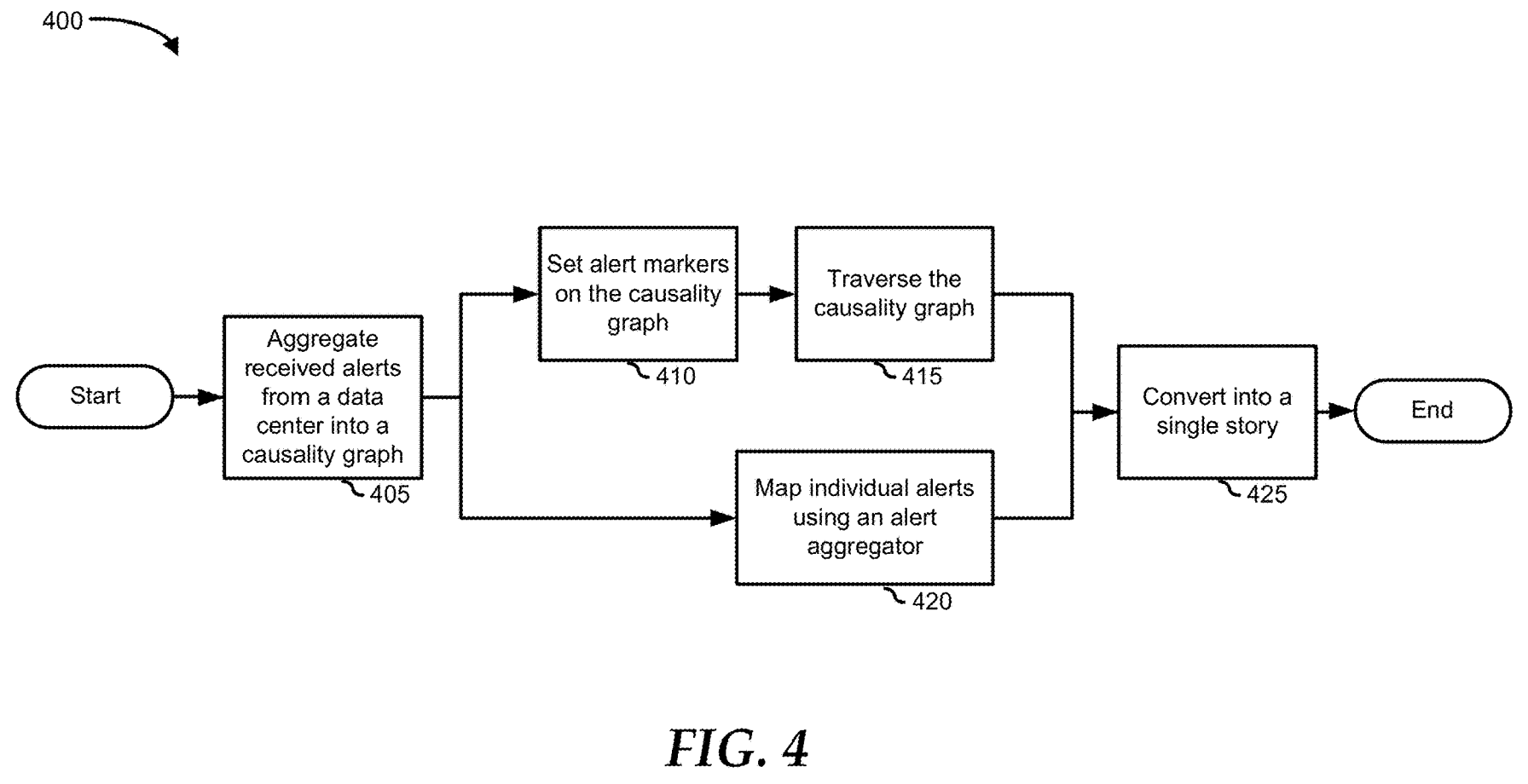

Start

Aggregate received alerts from a data center into a causality graph
405

Set alert markers on the causality graph
410

Traverse the causality graph
415

Map individual alerts using an alert aggregator
420

Convert into a single story
425

End

*FIG. 4*

PROACTIVE ALERT AGGREGATION AND CORRELATION MANAGEMENT WITH AUTOMATED SUMMARIZATION

FIELD OF THE DISCLOSURE

The present disclosure generally relates to information handling systems, and more particularly relates to proactive alert aggregation and correlation management with automated summarization.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a data store configured to store an account associated with a first alert and a second alert. A processor may receive the first alert and the second alert, map the first alert and the second alert to a first node and a second node of a causality graph, traverse the causality graph starting from the sink node to the source node to determine an association between the first alert and the second alert, and generate the account based on the association between the first alert and the second alert.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 1 is a block diagram illustrating an information handling system according to an embodiment of the present disclosure;

FIG. 4 is a flowchart illustrating an example of a method for proactive alert aggregation and correlation management with automated summarization, according to an embodiment of the present disclosure.

The use of the same reference symbols in different drawings indicates similar or identical items.

DETAILED DESCRIPTION OF THE DRAWINGS

Figure 2:
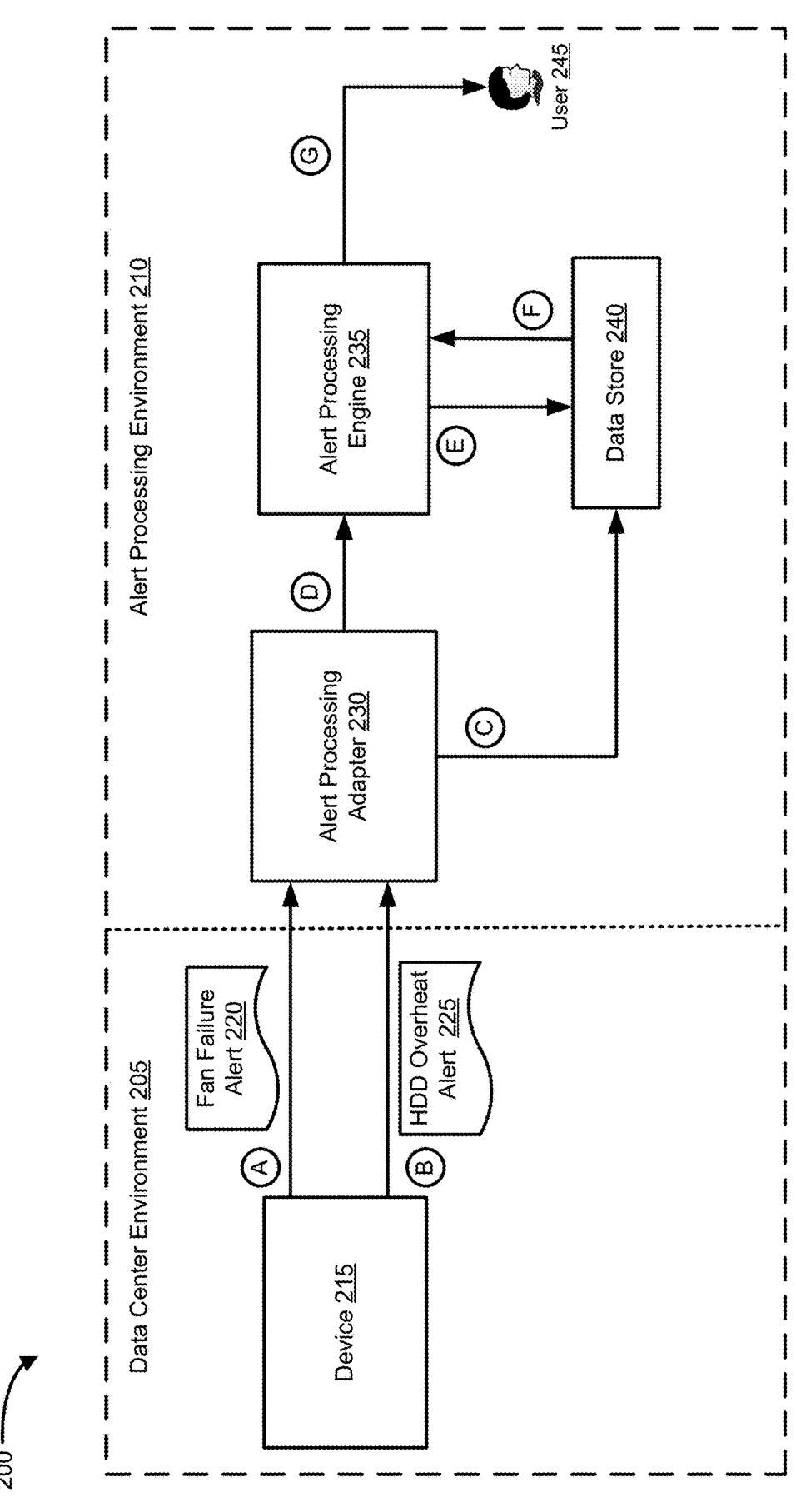
FIG. 2 is a block diagram illustrating an example of a system for proactive alert aggregation and correlation management with automated summarization, according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A data center typically includes various information handling systems, devices, and components that can generate an alert to indicate that an issue or event, such as a failure, power failure, etc. has occurred. The alert can be provided to an alert management system that usually classifies the alert into one of the various categories such as critical, normal, warning, error, severity 1, severity 2, severity 3, etc. A technical support specialist generally focuses on resolving the event that caused the alerts according to priority. However a support ticket for the alert typically does not include information regarding the main issue, also referred to as root cause of the alert. The technical support specialist may then proceed to identify the main issue or root cause of the alert that may be time-consuming as the technical support specialist attempts to correlate the alerts to determine the root cause.

For example a fan of one of the servers in the data center may stop functioning, and then one or more hard drives of the server may overheat and get noisy. Each of these events may generate an alert. However, the root cause is the fan failure that induced the hard drive to overheat and to be noisy. Without understanding the root cause, the technical support specialist may attempt to resolve the alerts associated with the hard drives before resolving the fan failure. Thus there is a need to identify any dependency and/or co-relation between the alerts and/or events and summarize multiple issues, alerts, and/or events of the same root cause not just on the device or information handling system level but also on the data center level. These also address an issue of too many support tickets being created for the technical support specialist to address, wasting time and resources instead of focusing on the root cause. To address these and other concerns, the present disclosure utilizes a system and method for an enterprise system that leverage artificial intelligence and causality graphs to determine the hierarchal relationship of the alerts and identify the root cause to tell a story or account of the issue.

FIG. 2 illustrates an example of system 200 where a proactive alert aggregation and correlation management with an automated summarization method may be implemented. System 200 includes a data center environment 205 and an alert processing environment 210. Data center environment 205 includes a device 215. Alert processing environment 210 includes an alert processing adapter 230, an alert processing engine 235, and a data store 240. The components of system 200 may be implemented in hardware, software, firmware, or any combination thereof. The components shown are not drawn to scale and system 200 may include additional or fewer components. In addition, connections between components may be omitted for descriptive clarity.

Device 215 described herein can be configured as hardware and may be included in an information handling system similar to information handling system 100 of FIG. 1. Device 215 may also be external to the information handling system such as a sensor. A portion of device 215 may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion cards), or a system (such as a motherboard, a system-on-a-chip (SoC), or a stand-alone device). Device 215 can include firmware embedded at a processor or software capable of operating a relevant environment of the information handling system. Device 215 can also include a combination of the foregoing examples of hardware or software, such as an HDD, SSD, camera, etc.

Alert processing adapter 230 may be configured to perform a root cause analysis of one or more alerts from a data center such as data center environment 205. In particular, alert processing adapter 230 may be configured to perform method 400 of FIG. 4. As part of the root cause analysis, alert processing adapter 230 is configured to understand the data coming from device 215 and have access to the data store 240. Alert processing adapter 230 may also be configured to analyze an alert, such as fan failure alert 220 and HDD overheat alert 225, coming to the backend and co-relate them with the open alerts and/or support tickets that exist for the data center. If alert processing adapter 230 finds an association that includes similarity, co-relation, or dependency between the alerts, instead of creating a new ticket, a support ticket associated with the root cause will be updated. For example, the support ticket may be appended with information associated with the associated alerts. This may reduce the noise and catch dependent or similar issues before creating an additional support ticket.

Data store 240 may be configured to store one or more data sets such as alerts, mapping tables, accounts associated with the alerts, support tickets, etc. associated with alert processing adapter 230 and alert processing engine 235. Data store 240 may be based on one or more data platforms such as relational databases, HADOOP™, etc. The data set may also be stored in various formats as text files, extensible markup language (XML) files, comma-separated values (CSV) files, etc. Data store 240 may be in a persistent storage device such as a solid-state disk, hard disk drive, magnetic tape library, optical disk drive, magneto-optical disk drive, compact disk drive, compact disk array, disk array controller, and/or any computer-readable medium operable to store data.

FIG. 2 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A which may be time zero, device 215 may generate fan failure alert 220. At stage B which may be time one, device 215 may generate HDD overheat alert 225. For example, an issue would be raised if a fan of a server in a data center stops working which may raise additional issues like an unexpected behavior of an HDD, overheating of the motherboard, etc. Typically, a separate alert and support ticket may be generated for each of the issues raised. With the present disclosure, alert processing adapter 230 may be configured to analyze the generated alerts and/or support tickets and determine the relationship, dependencies, and/or similarities of the generated alerts and support tickets. Further, alert processing adapter 230 may determine the root cause that is the fan failure.

Accordingly, a single support ticket may be generated for the associated alerts instead of one support ticket for each of the alerts. Alerts that are dependent or correlated to the root cause are appended to the support ticket. In this example, a support ticket for the fan failure may be created and the alerts associated with the unexpected behavior of the HDD, power supply failure, overheating of the motherboard, etc. may be appended to the support ticket. As such, when the technical support specialist reviews the support ticket, he may have a better picture of the current issues and identify the root cause for a speedy and efficient resolution instead of just addressing the symptoms.

At stage C, the alerts at stored in data store 240. The alerts are also transmitted to alert processing adapter 230 for processing at stage D. Alert processing adapter 230 may be located in alert processing adapter 230 which could be the environment of the vendor of device 215 and/or the information handling system. Alert processing engine 235 may query and/or update information at data store 240 at stages E and F. Alert processing adapter 230 may be configured to generate one or more support tickets based on the story also referred herein as an account of the issues and/or associated alerts received from alert processing adapter 230. The support ticket(s) are then transmitted to user 245 for resolution at stage G.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. The proposed solution is not only limited to finding similar issues reported from the same device. But it is capable enough to find the dependency between two issues.

Figure 3:
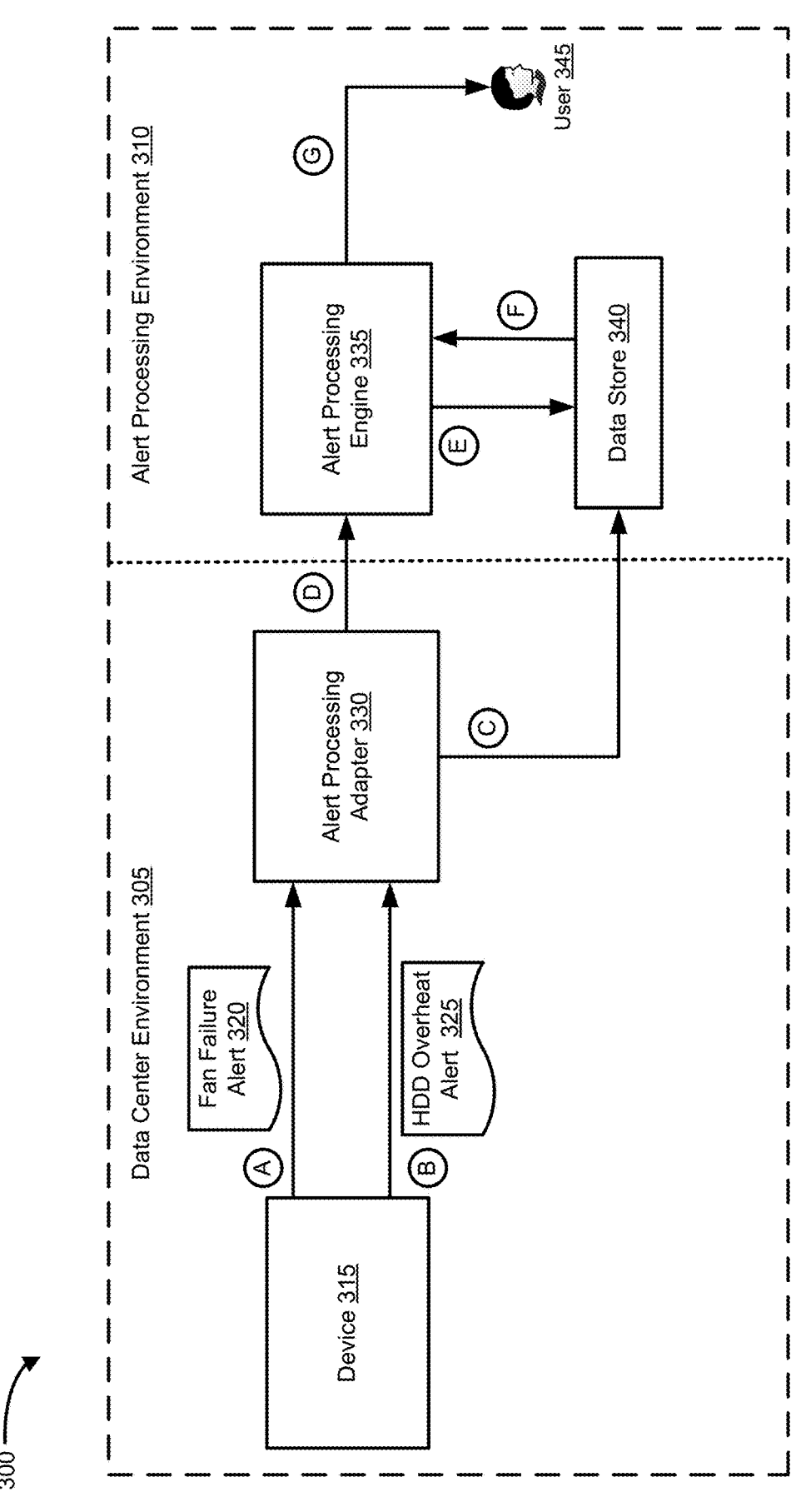
FIG. 3 is a block diagram illustrating an example of a system for proactive alert aggregation and correlation management with automated summarization, according to an embodiment of the present disclosure.

FIG. 3 illustrates an example of system 300 where a proactive alert aggregation and correlation management with an automated summarization method may be implemented similar to system 200 of FIG. 2. System 300 includes a data center environment 305 and an alert processing environment 310. Data center environment 305 includes a device 315 and an alert processing adapter 330. Alert processing environment 310 includes an alert processing engine 335 and a data store 340. The components of system 300 may be implemented in hardware, software, firmware, or any combination thereof. The components shown are not drawn to scale and system 300 may include additional or fewer components. In addition, connections between components may be omitted for descriptive clarity.

Device 315 is similar to device 215, alert processing engine 335 is similar to alert processing engine 235, and data store 340 is similar to data store 240 of FIG. 2. Alert processing adapter 330 may be configured to run as a service in a device such as device 315 and perform functions similar to alert processing adapter 230 of FIG. 2. The service can be tuned to receive the alerts raised by the device using simple network management protocol (SNMP) traps. In this example, fan failure alert 320 and HDD overheat alert 325 may be raised by the device at stage A and stage B respectively. The alerts may be received by alert processing adapter 330 which in turn performs an operation similar to method 400 of FIG. 4 combining the alert into an account before it is transmitted to alert processing engine 335 at stage D. The story includes information regarding fan failure alert 320 and HDD overheat alert 325, device 315, a root cause of the alerts, etc.

Other information associated with alerts and/or device 215, such as a service tag may also be transmitted to alert processing engine 235. The account and/or associated information may also be stored at data store 340 at stage C. During the processing of the account and/or associated information received from alert processing adapter 330, alert processing engine 335 may query and/or update information stored at data store 240 at stage E and stage F. The support ticket(s) generated by alert processing engine 335 are then transmitted to user 345 for resolution at stage G.

FIG. 4 shows a flowchart of a method 400 for proactive alert dependency management with smart aggregation and auto summarization. Method 400 may be performed by one or more components of system 200 of FIG. 2 or system 300 of FIG. 3. In particular, method 400 may be performed by alert processing adapter 230 of FIG. 2 or alert processing adapter 330 of FIG. 3. However, while embodiments of the present disclosure are described in terms of system 200 of FIG. 2 or alert processing adapter 330 of FIG. 3, it should be recognized that other systems may be utilized to perform the described method. One of skill in the art will appreciate that this flowchart explains a typical example, which can be extended to advanced applications or services in practice.

Figure 5:
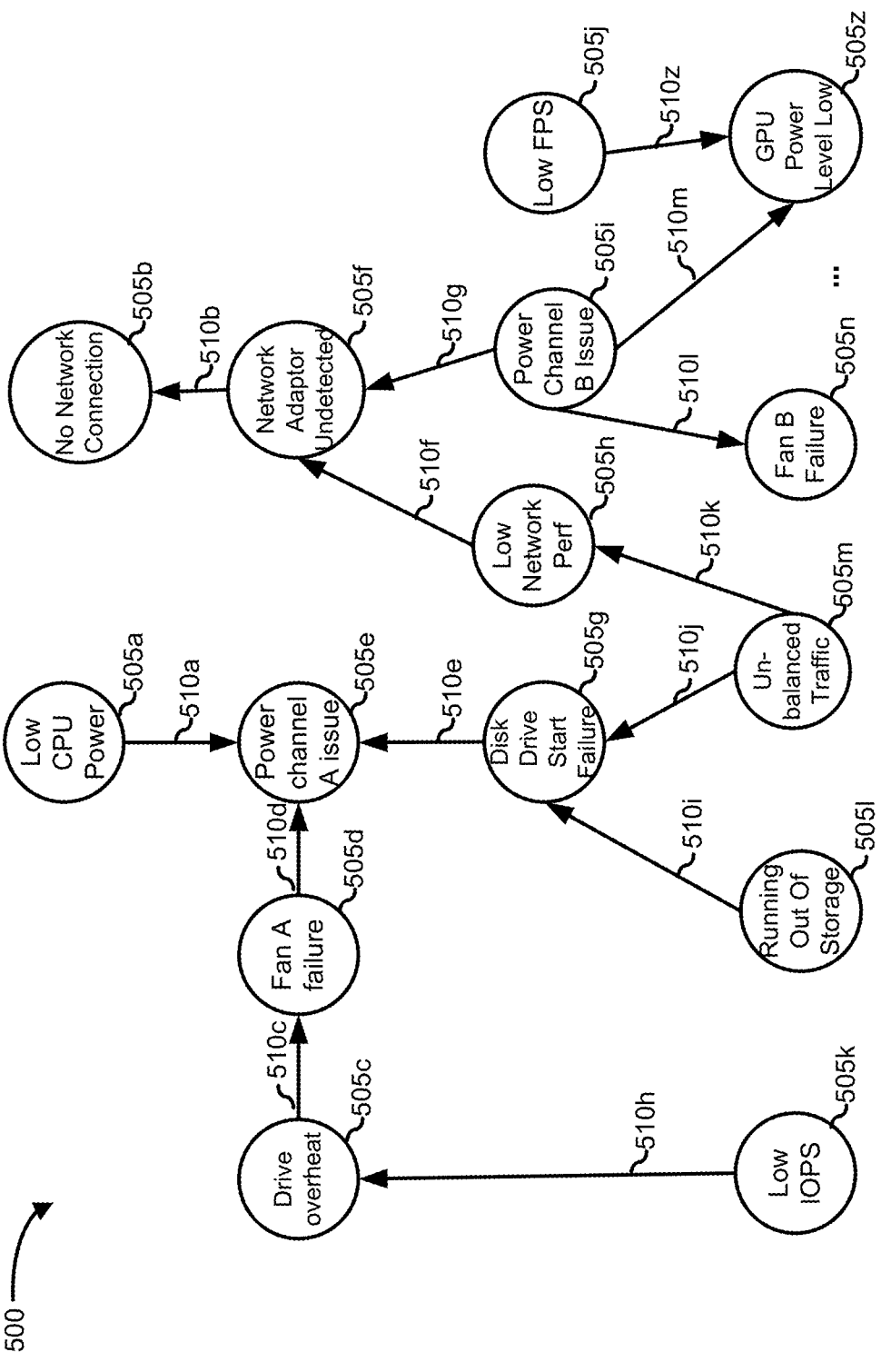
FIG. 5 is an example causality graph for proactive alert aggregation and correlation management with automated summarization, according to an embodiment of the present disclosure.

Method 400 typically starts at block 405 where it aggregates alerts from a data center or enterprise system into a causality graph similar to a causality graph 500 of FIG. 5. In particular the alerts may be mapped to a node in the causality graph. One or more of the alerts may be mapped to a sink node or a source node. In one embodiment, the alerts that are determined to have been generated within a specific time frame may be aggregated. At block 410, alert markers are set on the causality graph, wherein flags of nodes that are associated with the alerts are set. For example, the flag may be set from an initial state of zero to one if the node is associated with an alert. At block 415, the method may traverse the causality graph to determine the hierarchal association of the nodes. The traversal may start with the sink node that is a child node, and goes a level up to its parent and so on until a source node or a node that is not flagged is reached. The hierarchical association of the nodes may be used to determine an anomaly or the root cause of an alert, such that there is a dependency between the alerts, wherein the second alert exists because of the first alert.

The traversal is typically initiated from a sink node which represents the end process of a pipeline. At the start of the traversal, each node in the causality graph may be assigned an aggregation score which is initialized to one for each of the sink nodes and zero for the other nodes. The sink nodes are then added into a queue, which acts as first-in-first-out temporary storage of the nodes, wherein the nodes are added at the back end and deleted from the front. If the queue is empty, then the nodes with an aggregation score of zero are removed from the causality graph creating a new causality graph, wherein the nodes have an aggregation score of at least one. The source node of the new causality graph is a potential parent in the hierarchy. A prioritized list based on the aggregation score of the source node is generated.

If the queue is not empty, then the node at the front is popped from the queue. The method traverses to a parent of the current node, also referred to as a child node, and checks for the existence of an alert or event within a pre-determined time window, such as an hour, a half an hour, etc. If there is an alert or event within the pre-determined time window is found, then an aggregation score of the parent node is calculated and the parent node is then added to the queue. The aggregation score of the parent node is calculated as equal to the current aggregation score of the parent node plus the aggregation score of the child node. The aggregation score of the child node is calculated by multiplying the current aggregation score of the child node by a weight associated with the severity of the alert, wherein the more severe the alert, the greater the weight. An example of a pseudo-code for the traversal is shown below:

1. aggregation_score(sink_node)||1;
   aggregation_core(for all nodes except sink_node)||1;
   Add the sink node to a cnode_queue;
2. If cnode_queue is empty goto line 5, else:
   cnode||cnode_queue.pop
3. aggregation_score(pnode)<-aggregation_score (pnode)+aggregation_score(cnode)*alert_severity;
   Add pnode to cnode_queue;
4. Goto line 2;
5. Remove from the causality graph all nodes with aggregation_score equal to zero creating a new causality graph;
6. The source node(s) in the new causality graph is the potential parent(s) in the hierarchy.
7. Generate a prioritized list from the source node(s) using their aggregated scores.

Traversing the causality graph will create a trail(s) that shows the alerts which are connected and on a path to the same sink node(s). These alerts are depicted by nodes that are flagged which include the sink node(s). At block 420, the method may map one or more devices or components to a language that describes the alerts, root cause also referred to as the "main issue" based on the trail(s) that were created. For example, a low frame per second (FPS) can be mapped to low performance and graphics processing unit (GPU) while a high temperature hard drive can be mapped to overheat and HDD.

The method may map the alerts with the same semantic meaning to a single vocabulary. For example, words and phrases like hot, high temperature, etc. may be mapped to the single vocabulary "overheat" while voltage issue, low power, etc. may be mapped to the single vocabulary "power issue" and low FPS, low I/O per second, etc. may be mapped to "performance issues." The semantic meaning can be used for summarizing the alerts into an account or story of the alerts. For example, the semantic analysis of a first language term in the first alert and a second language term of the second alert may be determined to be semantically equivalent to a third language term. The first language term and the second language term may be mapped to the third language term which is at a row of the alert type mapping table which the columns show the associated devices. A one in the intersection of the row and column indicates that the device has the aforementioned alert or issue.

The story depicts the root cause and associated issues and related alerts. Various methodologies may be used to determine the single vocabulary which represents the semantic meaning of the alerts or issues such as the Word2Vec™ methodology. The mapping may be depicted using a table such as a table 1 below:

by including a link that the technical support specialist can double click and get more details into the underlying alerts that were aggregated.

FIG. 5 shows an example of causality graph 500 for proactive alert dependency management with smart aggregation and automatic summarization. Causality graph 500 includes nodes 505a-505z and edges 510a-510z. Causality graph 500 may be a directed graph with no cycles and is a graphical representation of the alerts of a particular data center which may be generated using a semi-supervised learning tool or created by domain experts. Each node represents an alert or a reason for the alert. The node may be a sink node or a source node. The sink node is a node considered as an input as it has an incoming directed edge but does not have an outward-directed edge. For example, nodes 505b, 505n, and 505z are sink nodes. The source node is a node that has an outward-directed edge but no incoming directed edge. For example, nodes 505a, 505k, 505l, and 505m are source nodes. A node that is associated with an alert or issue may be flagged to indicate occurrence of the

TABLE 1

| Device/Component to Alert Type Mapping | | | | | | | |
| --- | --- | --- | --- | --- | --- | --- | --- |
| Alert Type/Unit | Motherboard | HDD | CPU | . . . | Memory | Network | Power Supply | GPU |
| Overheat | 0 | 1 | 1 | 1 | 0 | 0 | 0 | 0 |
| Power Issue | 1 | 0 | 1 | 0 | 0 | 0 | 0 | 1 |
| Not Connected | 0 | 0 | 1 | 0 | 0 | 0 | 0 | 1 |
| . . . | | | | | | | | |
| Low Performance | 0 | 0 | 0 | 0 | 0 | 1 | 0 | 0 |

The alert or the main issue typically includes a short description that may be summarized and used to create an account for the technical support personnel at block 425. The account may include the devices and/or components affected and the main issue also referred to as the root cause. The account may go something like this: A power supply channel failure of server ABC123 caused the fan that cools the GPU to slow down and as a result, the GPU's performance degraded. Because each alert has its way to describe the issue the mapping allows the use of a single vocabulary to describe issues.

The method may generate a single ticket for the alerts/issues associated with the power supply, fan, and GPU. The method then includes the above story which allows the technical support personnel to efficiently resolve the issue. The story may also include a link that would allow getting detailed information into the underlying alerts that were aggregated. In general, the causality and connections between the nodes will be derived from the graph traversal, the language that describes the alerts and the system's components will come from vector mapping above, with both the account is composed by backward traversal from the sink node to determine the root cause and how it is propagated to different units.

For example, the story may include issues from one or more devices such as from the power failure issue of a fan to overheat issue of the motherboard because of the fan power failure. The account may also include a performance issue of the GPU because of the overheat issue of the motherboard. Thus, the account may include high-level issue description to a more detailed level of issue description. As an output, the account the alert processing adapter may provide the alert processing engine information to generate a single alert that will provide the high-level story, the components affected, and additional information such as issue or the alert. For example, each node may be associated with a flag that is initialized to zero if it is not associated with an alert. If the flag is set to one, then the node is said to be flagged and associated with an alert.

A directed edge or simply edge shows a connection between nodes that indicates a hierarchical relation of the nodes. For example, edge 510a is directed outward of node 505a which indicates that node 505a is a parent node and node 505e is a child node, such that an alert in the parent node may cause the alert in the child node. Here, a low CPU power may be a root cause of a power channel A issue. A node may have more than one child node. For example, node 505i has three child nodes, 505f, 505n, and 505z. Here, a power channel B issue may be the root cause of a fan B failure, a low power level of the GPU, or a network adaptor being undetected. The edge may also be referred to as a directed arc or simply an arc. The priority of the alert may be based on the length of the edge from one node to the nearest sink node. For example, node 505f has edge 510b between itself and node 505b which is a sink node. While node 505i has edges 510g and 510b between itself and node 505b. If both node 505f and node 505i are flagged, then node 505i may have a higher priority than node 505f.

Causality graph 500 may be updated each time an alert or issue is raised from the same data center or enterprise system within a particular time window. The alert may be mapped to a node in the causality graph and then the causality graph may be traversed to explore the parent nodes associated with the alert. An alert flag may be referenced by an alert aggregator to determine whether a particular node is associated with an alert or an issue. If a parent node is flagged, then it is added to the queue and an aggregation score is calculated. The aggregation score of the parent node includes the aggregation scores of the child node(s). A prioritized list of issues to be resolved may be generated from the source nodes based on the aggregation score(s). One of the skill in the art will appreciate that causality graph 500 is a simplified example for ease of illustration and is not intended to limit the scope of the present disclosure. Indeed, the causality graph in a real-world scenario will be much more complex.

Although FIG. 4 shows example blocks of method 400 in some implementation, method 400 may include additional blocks, fewer blocks, different blocks, or differently arranged blocks than those depicted in FIG. 4. Additionally, or alternatively, two or more of the blocks of method 400 may be performed in parallel. For example, block 415 and block 420 of method 400 may be performed in parallel.

Although the disclosures use the words "data table" or "table", data stored in various data stores or databases are not limited to a tabular data structure and can include non-relational data stores as well. Other types of data structures, such as, for example, trees, hashes, graphs, blockchain structures, and so on, can also be used to store various data described herein.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

receiving, by a processor, a first alert and a second alert;

determining a hierarchal association of nodes in a causality graph by traversing the nodes of the causality graph starting from a sink node until a source node is reached;

creating a trail of connected alerts on a path to the sink node with the traversing, wherein the trail of alerts is associated with flagged nodes among the nodes in the causality graph, wherein the trail of alerts includes the first alert and the second alert, wherein the first alert and the second alert are associated with a first node and a second node respectively, and wherein the first node and the second node are among the flagged nodes;

determining a root cause of the first alert and the second alert included in the trail of alerts associated with the flagged nodes based on the hierarchal association of the nodes;

determining a priority between a first priority of the first alert and a second priority of the second alert based on distance to the sink node along the path, wherein the first priority of the first alert has a lower priority with shorter distance to the sink node that includes a first edge, and wherein the second priority has a higher priority with longer distance to the sink node that includes the first edge and a second edge;

mapping the first alert and the second alert to a vocabulary and associated hardware component, wherein the vocabulary is based a semantic meaning of the first alert and the second alert;

generating an account of the root cause based on the mapping of the vocabulary and the associated hardware component;

generating a support ticket that includes the account of the root cause; and transmitting the support ticket to a technical support specialist to resolve the root cause according to the priority.

2. The method of claim 1, further comprising adding the sink node into a queue for processing.

3. The method of claim 1, wherein the causality graph is updated when alert is raised within a time window.

4. The method of claim 3, further comprising determining a first aggregation score that is associated with a parent node and a second aggregation score that is associated with a child node.

5. The method of claim 4, further comprising removing one or more nodes with an aggregation score of zero from the causality graph.

6. The method of claim 4, wherein the second aggregation score is multiplied by a weight associated with a severity of the second alert.

7. The method of claim 6, wherein the second aggregation score is added to the first aggregation score.

8. The method of claim 4, further comprising generating a prioritized list of issues based on the first aggregation score.

9. The method of claim 1, further comprising:

performing a semantic analysis of a first language term in the first alert and a second language term in the second alert; and determining that the first language term and the second language term are semantically equivalent to a third language term and mapping the first language term and the second language term to the third language term.

10. The method of claim 1, further comprising mapping the first alert and the second alert to a first device and a second device respectively.

11. The method of claim 1, further comprising if a node in the causality graph is associated with an alert, then flagging the node to indicate the alert has occurred.

12. An information handling system, comprising:

a data store configured to store an account associated with a first alert and a second alert; and a processor coupled to the data store, the processor configured to:

receive the first alert and the second alert;

map the first alert and the second alert, respectively, to a first node and a second node of a causality graph of nodes, wherein the first node is associated with a first flag and the second node is associated with a second flag, wherein the first flag is set to one and the second flag is set to one based on the map, and wherein the causality graph includes a third node;

calculate a first aggregation score of a sink node, a second aggregation score of a source node, and a third aggregation score of the third node, wherein the second aggregation score includes the first aggregation score, and wherein the third aggregation score is zero;

remove the third node from the causality graph in response to the third aggregation score being zero;

determine a hierarchal association of the sink node and the source node based on a traversal of the causality graph starting from the sink node until the source node is reached;

create a trail of connected alerts on a path to the sink node with the traversal of the causality graph, wherein the alerts in the trail are associated with flagged nodes among the nodes in the causality graph, wherein the trail of alerts includes the first alert and the second alert, wherein the first alert and the second alert are associated with the first node and the second node respectively, and wherein the first node and the second node are among the flagged nodes;

generate the account of a root cause of the first alert and the second alert included in the trail of alerts associated with the flagged nodes based on the hierarchal association;

determining a priority between a first priority of the first alert and a second priority of the second alert based on distance to the sink node along the path, wherein the first priority of the first alert has a lower priority with shorter distance to the sink node that includes a first edge, and wherein the second priority has a higher priority with longer distance to the sink node that includes the first edge and a second edge;

generate a support ticket that includes the account of the root cause; and send the support ticket to a technical support specialist to resolve the root cause according to the priority.

13. The information handling system of claim 12, wherein the causality graph is updated when alert is raised within a time window.

14. The information handling system of claim 13, wherein the processor is further configured to generate a prioritized list of issues based on the first aggregation score and the second aggregation score.

15. The information handling system of claim 12, wherein the processor is further configured to remove one or more nodes with an aggregation score of zero from the causality graph.

16. The information handling system of claim 12, wherein if a node in the causality graph is associated with an alert, then the processor is further configured to flag the node to indicate that the alert has occurred.

17. A non-transitory computer-readable medium including code that when executed performs a method, the method comprising:

receiving a first alert and a second alert;

traversing a causality graph starting from a sink node until a source node is reached, wherein the causality graph includes a plurality of nodes that includes at least the sink node and the source node;

creating a trail of connected alerts on a path to the sink node with the traversing, wherein the trail of alerts is associated with flagged nodes among the nodes in the causality graph, wherein the trail of alerts includes the first alert and the second alert, wherein the first alert and the second alert are associated with a first node and a second node respectively, and wherein the first node and the second node are among the flagged nodes;

determining a root cause of the first alert and the second alert included in the trail of alerts associated with the flagged nodes based on a hierarchal association of the nodes in the causality graph;

determining a priority between a first priority of the first alert and a second priority of the second alert based on distance to the sink node along the path, wherein the first priority of the first alert has a lower priority with shorter distance to the sink node that includes a first edge, and wherein the second priority has a higher priority with longer distance to the sink node that includes the first edge and a second edge;

mapping the first alert and the second alert to a vocabulary and associated hardware component, wherein the vocabulary is based a semantic meaning of the first alert and the second alert;

generating an account of the root cause based on the mapping of the vocabulary and the associated hardware component;

generating a support ticket that includes the account of the root cause; and transmitting the support ticket to a technical support specialist to resolve the root cause according to the priority.

18. The non-transitory computer-readable medium of claim 17, wherein the method further comprises determining a first aggregation score that is associated with a parent node and a second aggregation score that is associated with a child node.

19. The non-transitory computer-readable medium of claim 18, wherein the second aggregation score is multiplied by a weight associated with a severity of the second alert.

20. The non-transitory computer-readable medium of claim 17, wherein the method further comprises:

performing a semantic analysis of a first language term in the first alert and a second language term of the second alert; and determining that the first language term and the second language term are semantically equivalent to a third language term and mapping the first language term and the second language term to the third language term.

\* \* \* \* \*